United States Patent
Whitman et al.

(12)

(10) Patent No.: US 6,478,267 B1
(45) Date of Patent: Nov. 12, 2002

(54) PORTABLE SUPPORT FOR A VEHICLE SEAT

(75) Inventors: Jason P. Whitman, Canton, MI (US); Ian D. Haynes, Windsor (CA)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/785,359

(22) Filed: Feb. 16, 2001

(51) Int. Cl.[7] .................. F16M 11/00; F16M 11/38; F16M 11/26; F16M 11/32
(52) U.S. Cl. .................. 248/157; 248/161; 248/167; 248/170; 248/188.5; 248/440
(58) Field of Search ............... 248/161, 157, 248/170, 167, 440, 188.5, 188.6, 125.8, 346.07, 346.06, 346.3, 171, 439; 297/440.22; 296/63, 65.01, 65.06

(56) References Cited

U.S. PATENT DOCUMENTS 3,920,212 A * 11/1975 Westwood .................. 248/346
4,171,132 A * 10/1979 Kassai ....................... 272/70.3
4,196,881 A * 4/1980 Davidson ................... 248/157
4,278,387 A   7/1981 Sequela et al.
5,199,690 A * 4/1993 Marshall ................... 267/64.25
5,529,185 A   6/1996 Alspach et al.
5,911,465 A   6/1999 Yamamoto et al.
6,010,296 A   1/2000 Enders
6,012,755 A   1/2000 Hecht et al.
6,082,301 A * 7/2000 Kramer ....................... 119/61

* cited by examiner

Primary Examiner—Ramon O. Ramirez
Assistant Examiner—Amy J. Sterling
(74) Attorney, Agent, or Firm—MacMillan, Sobanski & Todd, LLC

(57) ABSTRACT

A seat support for supporting a vehicle seat outside the vehicle has a base frame adapted for engagement with a support surface outside the vehicle, a support frame configured to engage with and support the vehicle seat, and a plurality of legs connecting the base frame to the support frame. The legs are vertically adjustable in order to vertically adjust the support frame relative to the base frame.

23 Claims, 5 Drawing Sheets

PORTABLE SUPPORT FOR A VEHICLE SEAT

TECHNICAL FIELD

This invention relates to auxiliary seat supports that may be used to support a seat such as an automotive vehicle seat.

BACKGROUND OF THE INVENTION

Automotive vehicles such as sport utility vehicles and minivans typically include passenger seats that can be removed from the floor structure of the vehicle passenger compartment. Removable vehicle seats are typically configured for removable attachment to the floor of the vehicle. Once removed, the passenger seats must be carefully stored to prevent damage to the frame and vehicle floor mounting structure of the seats. Although the vehicle seats for these vehicles are usually removed to clear out the vehicle for hauling different loads, an increasingly common reason for removing the vehicle seat is to use the seat outdoors, such as for a tailgate party.

Typically, current automotive seat assemblies are not configured for use outside the vehicle. The risk of damage to the frame or vehicle floor mounting structure of the seats, and the low profile of the removed seat relative to the ground make it impracticable to use the seat outside of the vehicle. Further, the support frame and latching mechanisms on the bottom portion of the vehicle seat can pick up dirt from a paved or unpaved surface outside of the vehicle, and this dirt can interfere with proper operation of the latching mechanism.

It would be advantageous if there could be developed a vehicle seat support that is portable.

It would also be advantageous if there could be developed a vehicle seat support that is adjustable in height.

Further, it would be advantageous if there could be developed a vehicle seat support that is collapsible for storage within or without a vehicle.

SUMMARY OF THE INVENTION

The above objects as well as other objects not specifically enumerated are achieved by a seat support for supporting a vehicle seat outside the vehicle. The seat support comprises a base frame adapted for engagement with a support surface outside the vehicle; a support frame configured to engage with and support the vehicle seat; and a plurality of legs connecting the base frame to the support frame. The legs are vertically adjustable in order to vertically adjust the support frame relative to the base frame.

In a preferred embodiment of the invention, the legs are telescoping tubes comprising: a first tubular element pivotally attached to the base frame, and having at least one transverse hole; and a second tubular element pivotally attached to the support frame, and arranged to slidably engage the first tubular element. The second tubular element has a plurality of longitudinally arranged, spaced apart transverse holes. The first tubular element includes a detent pin for selectively engaging one of the holes in each of the first and second tubular elements.

Various objects and advantages of this invention will become apparent to those skilled in the art from the following detailed description of the preferred embodiment, when read in light of the accompanying drawings.

DETAILED DESCRIPTION OF THE INVENTION

Figure 1:
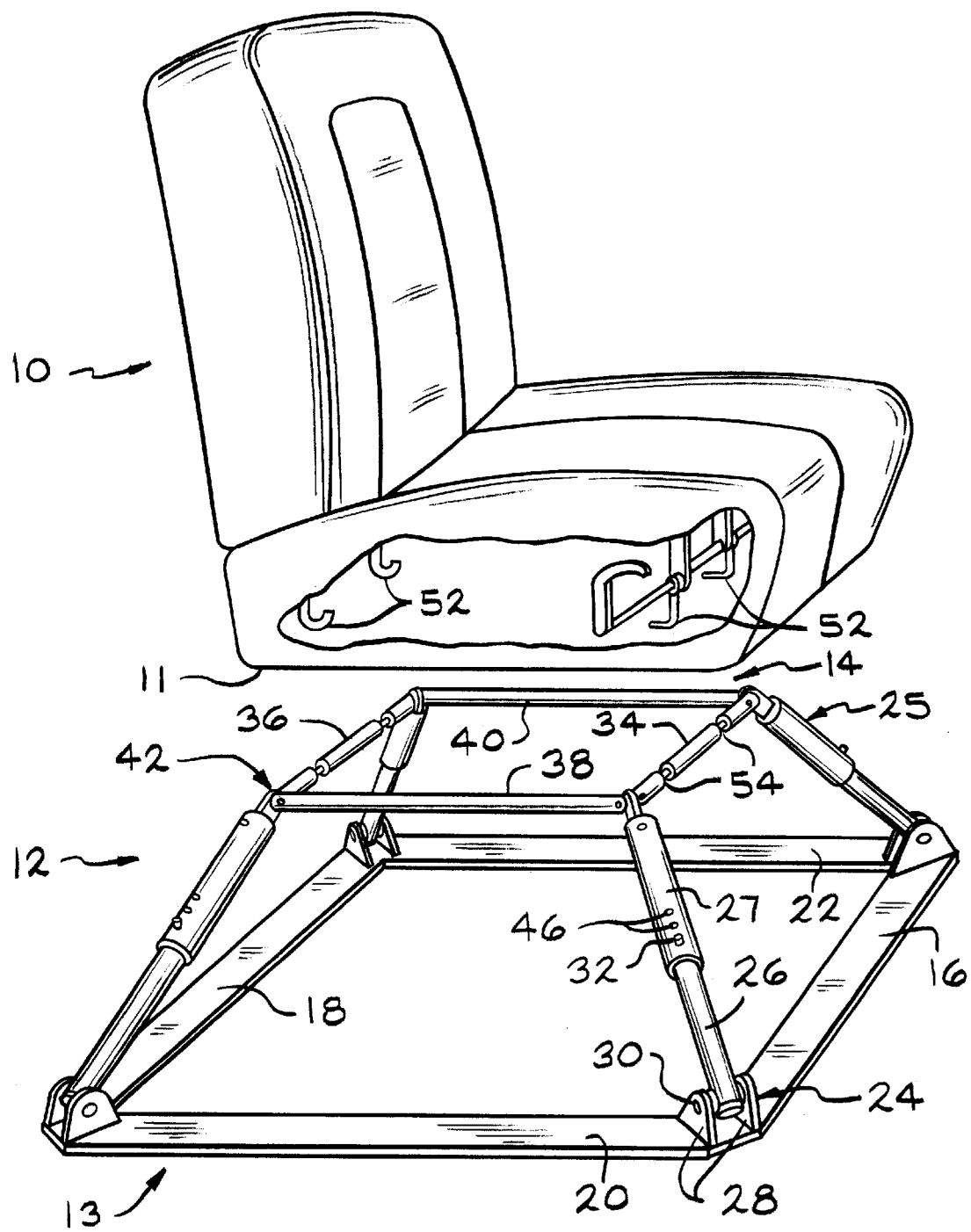
FIG. 1 is a perspective view of a portable seat support according to the present invention, and an associated vehicle seat.

FIG. 1 shows a typical automotive vehicle seat 10 having a seat portion suitable for supporting a passenger, and a bottom portion 11. The vehicle seat 10 can be any suitable seat configuration which can be used as a mounted seat within the vehicle, but is removable and useable outside of the vehicle, as will be explained below. Preferably, the seat 10 is relatively lightweight so that it can be easily removed from the vehicle and handled.

Figure 2:
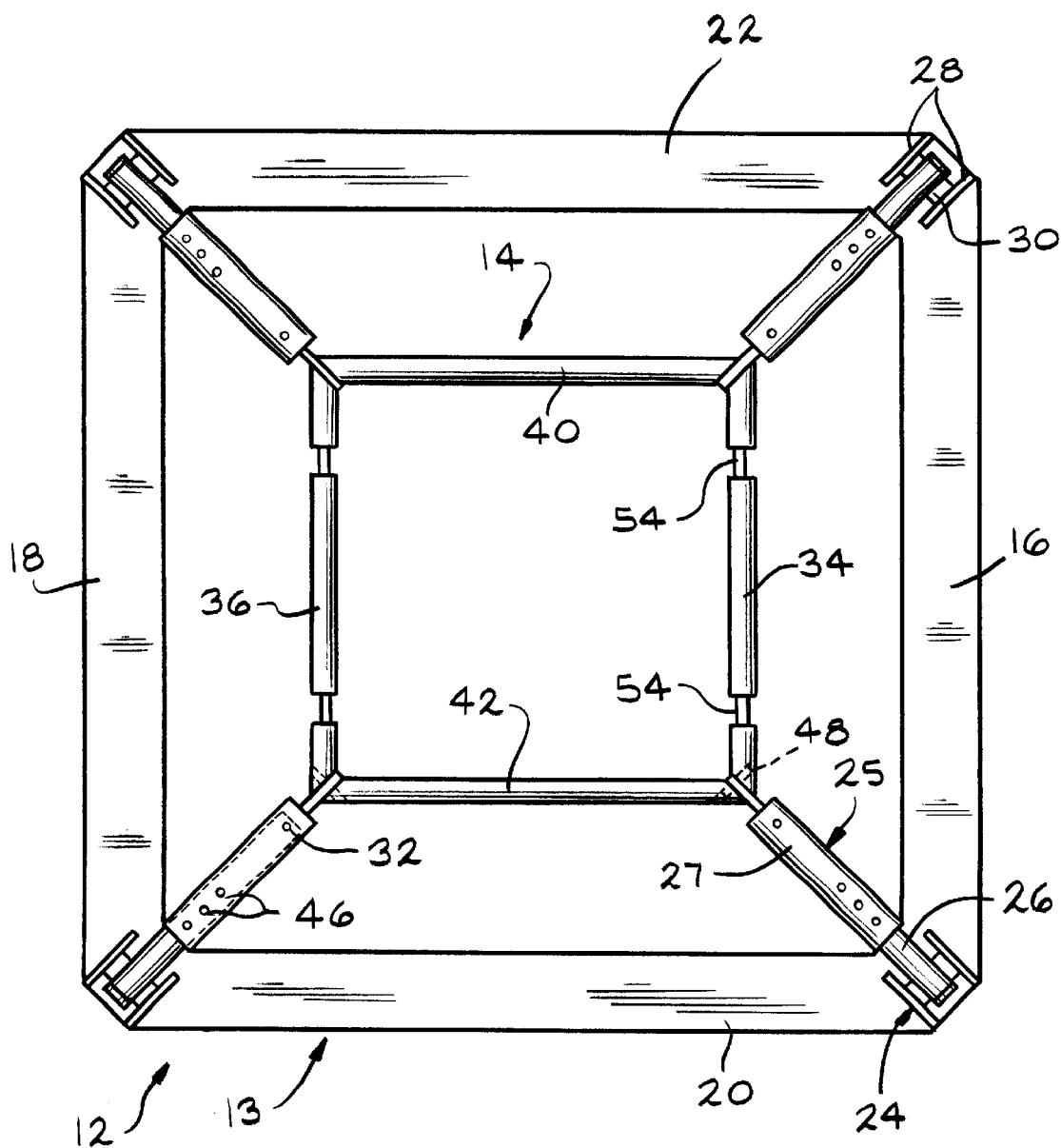
FIG. 2 is a plan view of the portable seat support illustrated in FIG. 1.

The seat support of the invention is generally designated by reference numeral 12 and is comprised of a base frame 13 and a support frame 14. As illustrated in FIGS. 1 and 2, the base frame 13 is a generally annular structure having upward and downward facing surfaces, the downward facing surface being adapted for engagement with a support surface outside the vehicle. In the preferred embodiment the generally annular structure is a generally rectangular structure defined by a front elongated base member 16, a rear elongated base member 18, and spaced apart side elongated base members 20, 22. The front elongated base member 16 is. connected to the front edges of the side elongated base members 20, 22. The rear elongated base member 18 is connected to the rear edges of the side elongated base members 20, 22. It should be noted that although a rectangular base frame structure is illustrated in the preferred embodiment, the generally annular structure may include other base frame configurations such as a circular structure.

The base frame 13 includes a plurality of first single axis pivots 24, each secured in any suitable manner to one or more of the base members, 16, 18, 20 and 22. The seat support 12 also includes a plurality of legs 25 that connect or link together the base frame 13 with the support frame 14. Preferably, the legs 25 are in the form of first tubular elements 26 and second tubular elements 27. The pivots 24 include spaced apart brackets or side members 28 which extend upwardly from the base frame 13. Pivot pins 30 are disposed at the proximal ends of the first tubular elements 26, and are operative to pivotally connect the tubular elements 26 to the brackets 28 of the pivots 24. The pivots 24 are arranged at a suitable angle such that the distal ends of the tubular elements 26 are oriented inward with respect to the base frame 13. The tubular elements 26 include a radially outwardly extending, spring biased detent pin 32.

As further illustrated in FIGS. 1 and 2, the support frame 14 is also a generally annular structure configured to engage with and support the vehicle seat 10. In the preferred embodiment the generally annular structure is a generally rectangular structure defined by a front elongated support member 34, a rear elongated support member 36, and spaced apart side elongated support members 38, 40. The front elongated support member 34 is connected to the front edges of the side elongated support members 38, 40. The rear elongated support member 36 is connected to the rear edges of the side elongated support members 38, 40. It should be noted that although in the preferred embodiment a square support base frame structure is illustrated, a generally annular structure may include other support frame configurations such as a rectangular or circular structure.

The support frame 14 includes second single axis pivots 42 suitably formed within the support frame 14, and the second tubular elements 27. The tubular elements 27 have a plurality of longitudinally arranged, spaced apart transverse holes 46. Pivot pins 48 are disposed at the proximal ends of the second tubular elements 27, and are operative to pivotally connect the tubular elements 27 to the pivots 42 of the support frame 14. The pivots 42 are arranged at a suitable angle such that the distal ends of the second tubular elements 27 are oriented outward with respect to the support frame 14.

The first tubular elements 26 are arranged to slidably engage the second tubular elements 27, so that each leg 25 is in the form a telescoping tube. The detent pin 32 may be selectively engaged with one of the transverse holes 46 of the second tubular element 27 in order to adjust the height of the support frame 14 relative to the base frame 13. Although in the preferred embodiment the first tubular element 26 is slidably engaged internal with respect to the second tubular element 27, it makes no difference which tube is internal and which is external.

As illustrated in FIG. 1, the legs 25 are of equal length, causing the support frame 14 to be parallel with respect to the base frame 13. However, it is to be understood that each leg is independently adjustable, thereby allowing the seat support 12 to accommodate sloped or uneven terrain or surfaces.

The base frame 13 is constructed preferably from solid aluminum, and the support frame 14 is constructed preferably from hollow aluminum tubes, although other materials such as solid or tubular aluminum, and solid or tubular plastic can be used.

Figure 4:
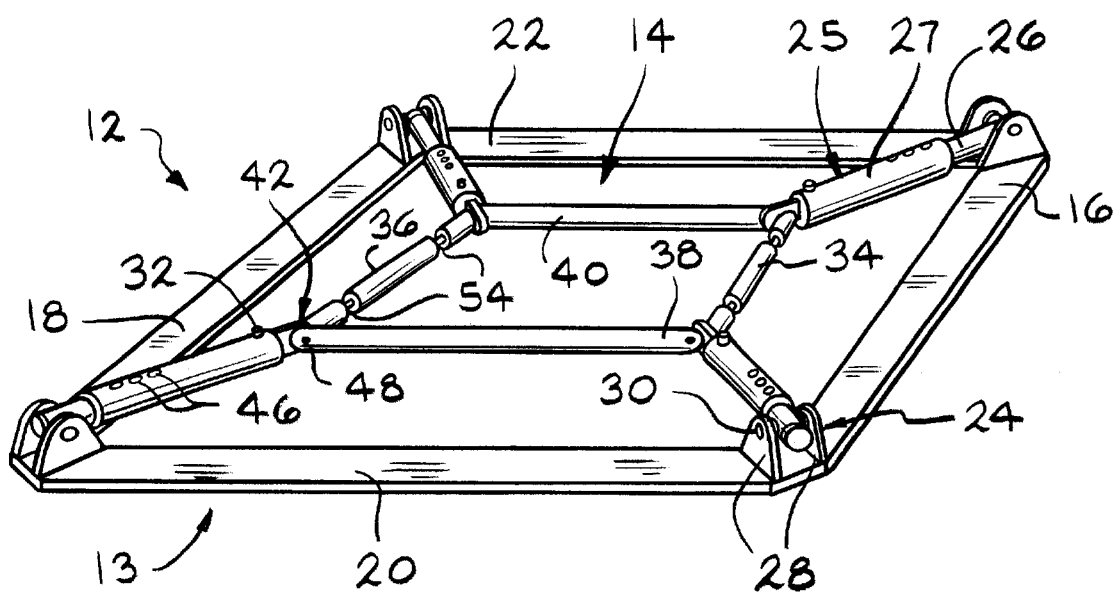
FIG. 4 is a perspective view of the portable seat support illustrated in FIG. 1, showing the seat support in a fully collapsed position.
Figure 5:
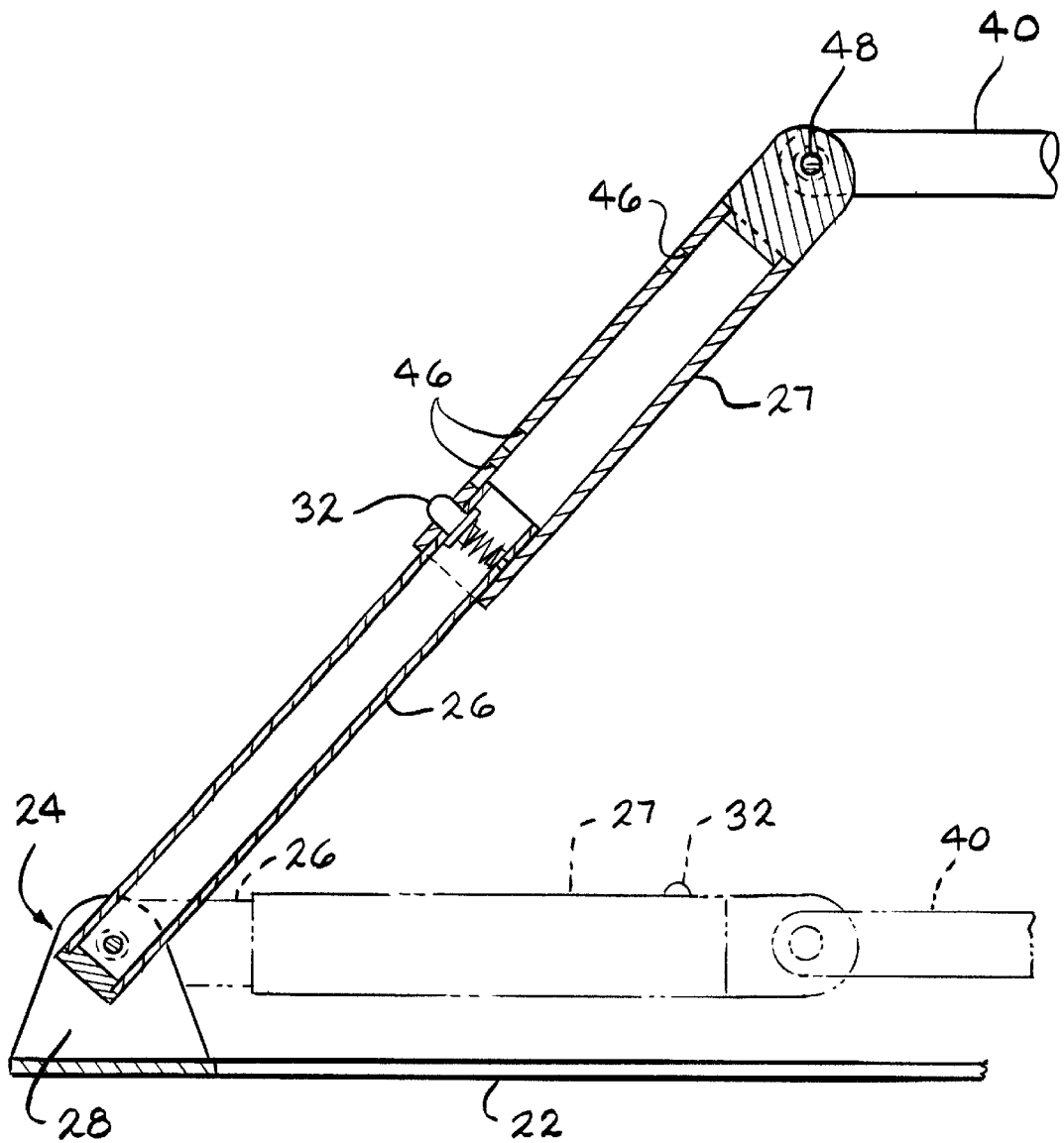
FIG. 5 is a partial cross-sectional side view of the portable seat support illustrated in FIG. 1, showing a leg in a fully extended position, and the leg in a fully collapsed position in phantom.

As shown in FIGS. 4 and 5, the seat support 12 can be collapsed into a generally flat structure having a height of less than 50 percent of the maximum extended height of the seat support 12, and preferably less than about 25 percent. The generally flat structure is thereby capable of being stored in a vehicle in an area such as under the rear cargo area. Additionally, a fully or partially collapsed seat support 12 can be incorporated for use in the vehicle, for example as a spare tire cover.

As shown in FIG. 1, the seat support 12 is illustrated at an extended height such that the vehicle seat 10 can be supported on the seat support 12 of the invention. The elongated support members 34, 36, 38 and 40 are tubular in shape and are of a diameter suitable for receiving typical locking or latching means 52 of the vehicle seat 10 of a variety of seat structures. The front and rear support members 34, 36 are provided with a plurality of sections 54 having a diameter smaller that the diameter of each of the front and rear support members 34, 36, to accommodate alternative seat locking or latching means such as C-shaped clips. The pivots 24, 42, pivot pins 30, 48, and smaller diameter sections 54 of support members 34, 36 are constructed preferably from steel, although other materials may also be used.

Referring now to FIG. 4, the base frame 13 is larger than the support frame 14 so that the support frame 14 can fit within the base frame 13 when the seat support 12 is in a fully collapsed position. As further illustrated in FIGS. 1 and 2, the base frame 13 is larger than the support frame 14 so that stability is enhanced when the seat support 12 is extended and supporting a seat 10.

Figure 3:
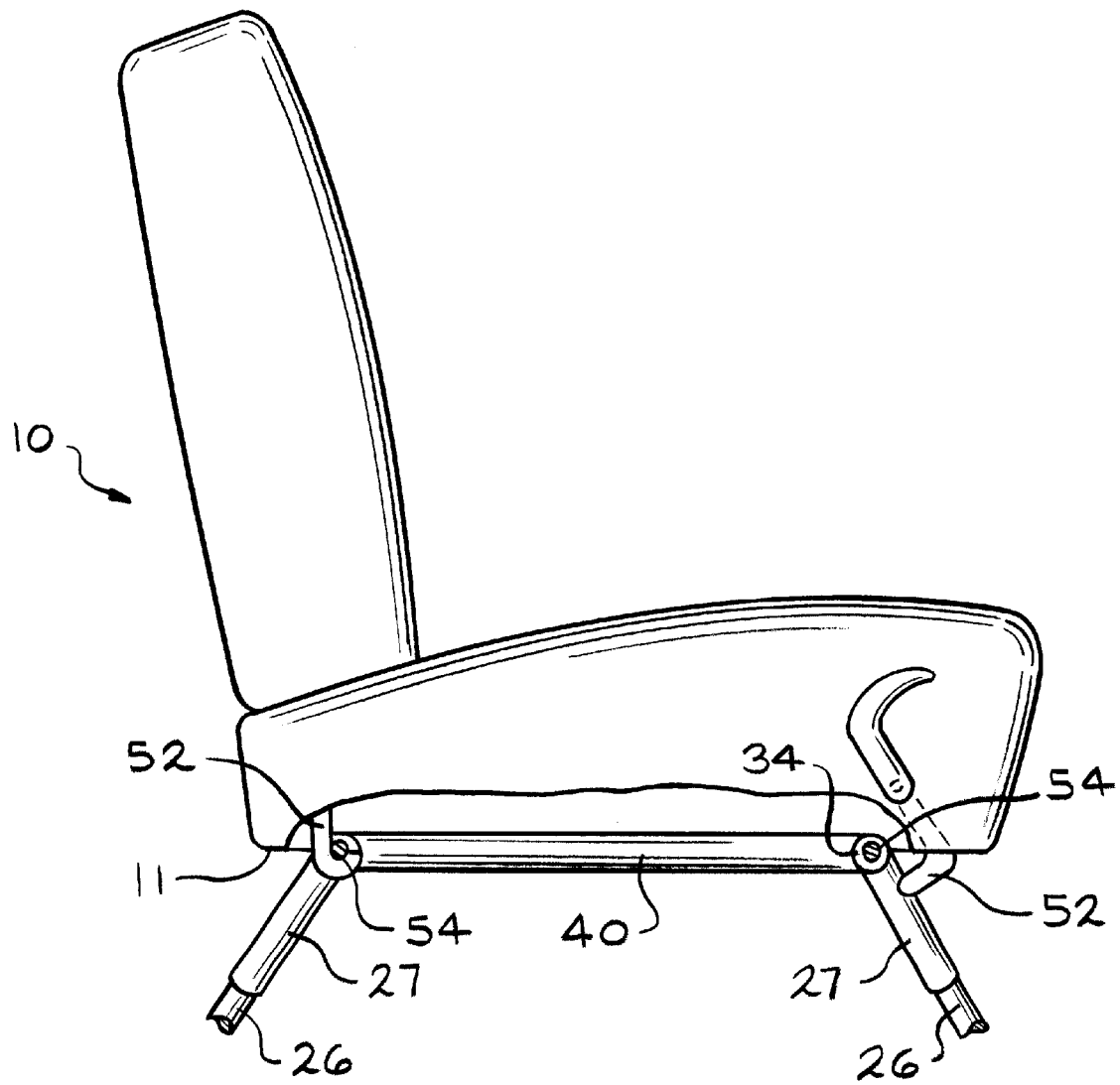
FIG. 3 is a fragmentary side view of the portable seat support illustrated in FIG. 1, showing the front and rear members of the support frame, and an associated vehicle seat with a latch mechanism.

A typical use of the present seat support includes the following steps: 1) removing the seat support 12 from the vehicle or from some other storage location; 2) placing the base frame 13 on a generally horizontal support surface outside the vehicle; 3) raising the support frame 14 by extending the second tubular elements 27 of the telescoping tube assembly outward of the base frame 13; 4) permitting the detent pins 32 of the first tubular elements 26 to engage one of the transverse holes 46 of the second tubular elements 27, thereby allowing the support frame 14 to be adjusted vertically relative to the base frame 13; and 5) removing the vehicle seat 10 from the vehicle and attaching the bottom portion of the vehicle seat 10 to the seat support 12, as illustrated in FIGS. 1 and 3, such that the vehicle seat locking or latching means 52 are suitably received on the front and rear support members 34, 36 of the support frame 14. To remove the vehicle seat and store the seat support 12 in the vehicle, perform steps 1 through 5 in reverse.

Although the legs 25 are illustrated as telescoping tubes 26, 27, it is to be understood that other structural components can be used to connect the seat support 14 to the base frame 13. For example, the legs 25 can comprise vertically oriented plates, not shown, that are adapted to easily clip on to the base frame 13 and support frame 14. It should also be understood that the base frame 13, the support frame 14, and the legs 25 do not have to be separate structures but can be integral structures of each other. For example, the legs 25 can be defined as any integral structure or extension formed from the base frame 13 or support frame 14. Thus, the legs 25 can be defined as any structure which permits any suitable base frame structure to be vertically adjustable relative to any suitable support frame structure.

It can be seen that by using hollow, lightweight materials, and by providing the base frame 13 and support frame 14 in the form of an annular perimeter-forming structure (i.e. the elongated base members 16, 18, 20 and 22, and the elongated support members 34, 36, 38 and 40), the seat support 12 of the invention is very light weight.

The principle and mode of operation of this invention have been described in its preferred embodiments. However, it should be noted that this invention may be practiced otherwise than as specifically illustrated and described without departing from its scope.

What is claimed is:

1. A seat support for supporting a vehicle seat outside the vehicle to permit a vehicle occupant to sit on said vehicle seat, said seat support comprising:

a base frame adapted for engagement with a support surface outside the vehicle;

a support frame having a latch receiving portion for receiving a latch of said vehicle seat, said latch receiving portion and said latch cooperating to fixedly secure said support frame to said vehicle seat, thereby securing said vehicle seat for supporting the vehicle occupant sitting on said vehicle seat; and a plurality of legs connecting said base frame to said support frame, said legs being vertically adjustable in order to vertically adjust said support frame relative to said base frame.

2. The seat support according to claim 1, wherein said support frame is adapted for engagement with the bottom portion of the seat.

3. The seat support according to claim 1, wherein said base frame is adapted for engagement with a generally horizontal surface outside the vehicle.

4. The seat support according to claim 1, wherein said support frame is adapted for locking the vehicle seat to said support frame.

5. The seat support according to claim 4, wherein said support frame is adapted for locking the vehicle seat to said support frame with a latch.

6. The seat support according to claim 1, wherein said base frame is larger than said support frame such that said legs are caused to slant inwardly and upwardly from said base frame.

7. The seat support according to claim 1, wherein said legs are telescoping tubes.

8. The seat support according to claim 7, wherein the telescoping tubes comprise:
   a first tubular element pivotally attached to said base frame, said first tubular element having at least one transverse hole;
   a second tubular element pivotally attached to said support frame, said second tubular element slidably engaging the first tubular element, said second tubular element having a plurality of longitudinally arranged, spaced apart transverse holes; and
   a pin for selectively engaging one of the holes in each of the first and second tubular elements.

9. The seat support according to claim 1, wherein said base frame is generally planar, said support frame is generally planar, and said support frame is connected to said base frame by a plurality of connecting legs.

10. The seat support according to claim 9, wherein the connecting legs are telescoping tubes for vertical adjustment.

11. The seat support according to claim 1, wherein said base frame comprises a plurality of elongated base members, and said support frame comprises a plurality of elongated support members that are configured to engage the vehicle seat.

12. The seat support according to claim 11, wherein the elongated base members and the elongated support members are arranged in a generally annular configuration.

13. A seat support for supporting a vehicle seat outside the vehicle to permit a vehicle occupant to sit on said vehicle seat, said seat support comprising:
   a base frame adapted for engagement with a generally horizontal support surface outside the vehicle;
   a support frame connected to said base frame, said support frame configured to engage with and support the bottom portion of the vehicle seat, said support frame being vertically adjustable relative to said base frame, said support frame having a latch receiving portion for receiving a latch of said vehicle seat, said latch receiving portion and said latch cooperating to fixedly secure said support frame to said vehicle seat, thereby securing said vehicle seat for supporting the vehicle occupant sitting on said vehicle seat;
   a plurality of telescoping tubes for connecting said base frame to said support frame, said telescoping tubes comprising:
      a first tubular element pivotally attached to said base frame, said first tubular element having at least one transverse hole;
      a second tubular element pivotally attached to said support frame, said second tubular element slidably engaging said first tubular element, said second tubular element having a plurality of longitudinally arranged, spaced apart transverse holes; and
      a detent pin for selectively engaging one of the holes in each of said first and second tubular elements.

14. A seat support for supporting a vehicle seat outside the vehicle to permit a vehicle occupant to sit on said vehicle seat, said seat support having a latch receiving portion for receiving a latch of said vehicle seat, said latch receiving portion and said latch cooperating to fixedly secure said support frame to said vehicle seat, thereby securing said vehicle seat for supporting the vehicle occupant sitting on said vehicle seat, said seat support being capable of being collapsed for storage in the vehicle.

15. The seat support according to claim 14, wherein said seat support is capable of being collapsed to a height of less than fifty percent of the maximum extended height of said seat support.

16. The seat support according to claim 14, comprising:
   a base frame adapted for engagement with a support surface outside the vehicle; and
   a support frame connected to said base frame, said support frame configured to engage with and support the vehicle seat.

17. The seat support according to claim 16, wherein said support frame is adjustable with respect to the base frame for height adjustment of the vehicle seat.

18. The seat support according to claim 17, wherein said support frame is adapted for engagement with the bottom portion of the vehicle seat, said support frame adapted for locking the vehicle seat to said support frame with a latch.

19. The seat support according to claim 14, wherein the collapsing of said seat support is carried out by using a plurality of telescoping tubes.

20. The seat support according to claim 19, wherein the telescoping tubes comprise:
   a first tubular element pivotally attached to said base frame, said first tubular element having at least one transverse hole;
   a second tubular element pivotally attached to said support frame, said second tubular element slidably engaging the first tubular element, said second tubular element having a plurality of longitudinally arranged, spaced apart transverse holes; and
   a pin for selectively engaging one of the holes in each of the first and second tubular elements.

21. The seat support according to claim 1, wherein said support frame is adapted for receiving a plurality of latches, said latches being latches for fixedly securing said vehicle seat within a vehicle.

22. The seat support according to claim 21, wherein said support frame includes a first latch receiving portion for receiving a first latch of said vehicle seat, and a second latch receiving portion for receiving a second latch of said vehicle seat, said first latch receiving portion and said first latch cooperating to fixedly secure said support frame to a rear portion of said vehicle seat, and said second latch receiving portion and said second latch cooperating to fixedly secure said support frame to a front portion of said vehicle seat, thereby securing said vehicle seat for supporting the vehicle occupant sitting on said vehicle seat.

23. The seat support according to claim 1, said seat support being movable between a collapsed position and an extended position, wherein said support frame is adapted to fit within said base frame when said seat support is in the collapsed position.

* * * * *